(12) United States Patent
Lee

(10) Patent No.: US 8,376,430 B1
(45) Date of Patent: Feb. 19, 2013

(54) HAND TOOL

(75) Inventor: Christopher Ryan Lee, Missouri City, TX (US)

(73) Assignee: LHR Services and Equipment, Inc., Pearland, TX (US)

( * ) Notice: Subject to any disclaimer, the term of this patent is extended or adjusted under 35 U.S.C. 154(b) by 0 days.

(21) Appl. No.: 13/450,839

(22) Filed: Apr. 19, 2012

(51) Int. Cl.
*A47F 13/06* (2006.01)
(52) U.S. Cl. .................. 294/24; 294/175; 294/211
(58) Field of Classification Search .......... 294/24, 294/175, 22, 23, 209, 211, 131, 178, 58, 294/99.1, 902
See application file for complete search history.

(56) References Cited

U.S. PATENT DOCUMENTS

| | | | | |
|---|---|---|---|---|
| 116,739 | A | * | 7/1871 | Murphy .................. 294/131 |
| 461,805 | A | * | 10/1891 | Rugg ...................... 294/22 |
| 2,869,914 | A | * | 1/1959 | Yoakley, Jr. ............. 294/22 |
| 4,418,732 | A | | 12/1983 | Kolonia |
| 4,580,825 | A | * | 4/1986 | Johnson ................. 294/24 |
| 5,566,538 | A | * | 10/1996 | Frazier et al. ........... 56/239 |
| 5,915,770 | A | | 6/1999 | Bergstrom |
| 5,964,489 | A | * | 10/1999 | Mahoney ............... 294/24 |
| 6,070,924 | A | * | 6/2000 | Sweetman ............. 294/24 |
| 6,352,291 | B1 | * | 3/2002 | Tortajada .............. 294/24 |
| 6,425,614 | B1 | * | 7/2002 | Limber et al. ......... 294/24 |
| 7,076,937 | B1 | | 7/2006 | Hanford |
| 7,429,067 | B1 | * | 9/2008 | Rosa ...................... 294/175 |
| 7,712,189 | B2 | | 5/2010 | Francisco et al. |
| 8,104,811 | B2 | | 1/2012 | Sèguin |
| 2002/0088090 | A1 | | 7/2002 | Langeliers et al. |
| 2009/0119933 | A1 | | 5/2009 | Mace et al. |
| 2012/0006179 | A1 | | 1/2012 | Alleyne |

FOREIGN PATENT DOCUMENTS

| | | |
|---|---|---|
| CA | 2 485 440 C | 7/2010 |
| EP | 1 486 294 A1 | 12/2004 |
| GB | 1 286 391 | 8/1972 |
| GB | 1 336 659 | 11/1973 |
| GB | 2 209 301 A | 5/1989 |
| GB | 2 303 285 A | 2/1997 |
| JP | 2000-167786 A | 6/2000 |
| WO | 96/35554 A1 | 11/1996 |
| WO | 98/36633 A1 | 8/1998 |
| WO | 2004/103644 A2 | 12/2004 |
| WO | 2007/001508 A2 | 1/2007 |
| WO | 2007/051891 A1 | 5/2007 |

* cited by examiner

*Primary Examiner* — Saul Rodriguez
*Assistant Examiner* — Gabriela Puig
(74) *Attorney, Agent, or Firm* — Vorys, Sater, Seymour and Pease LLP; William L. Klima

(57) ABSTRACT

A hand tool including a handle and a tool head. The tool head is a V-shaped or modified V-shaped tool head.

28 Claims, 8 Drawing Sheets

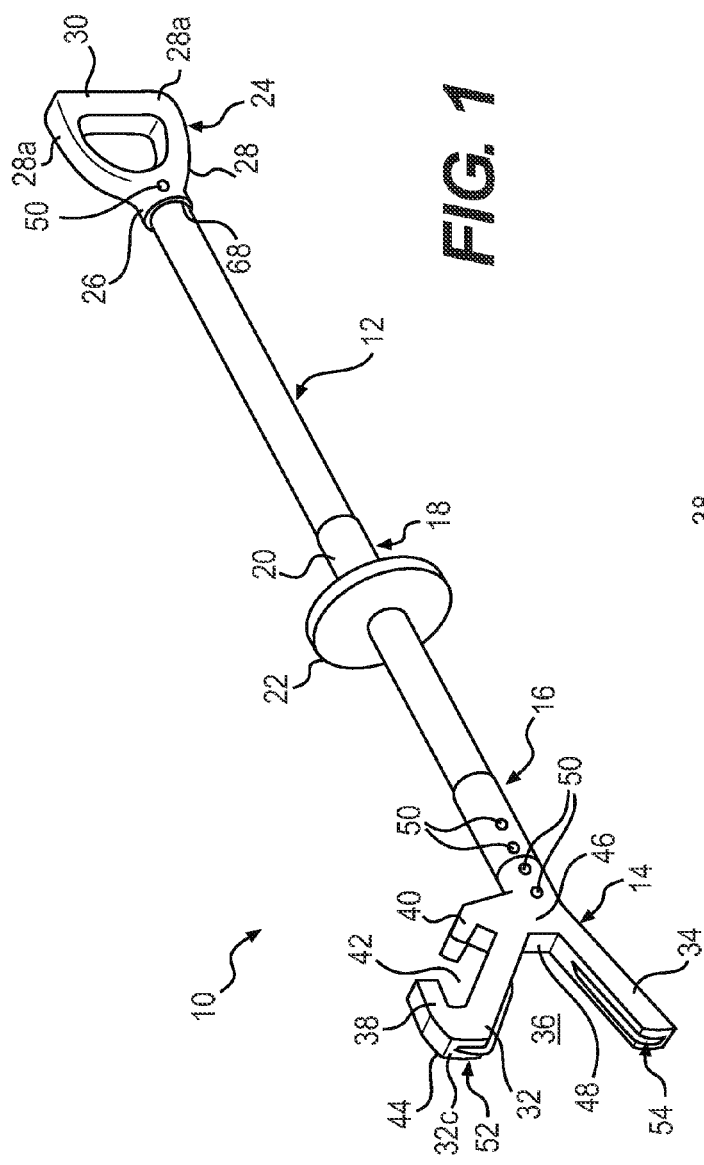
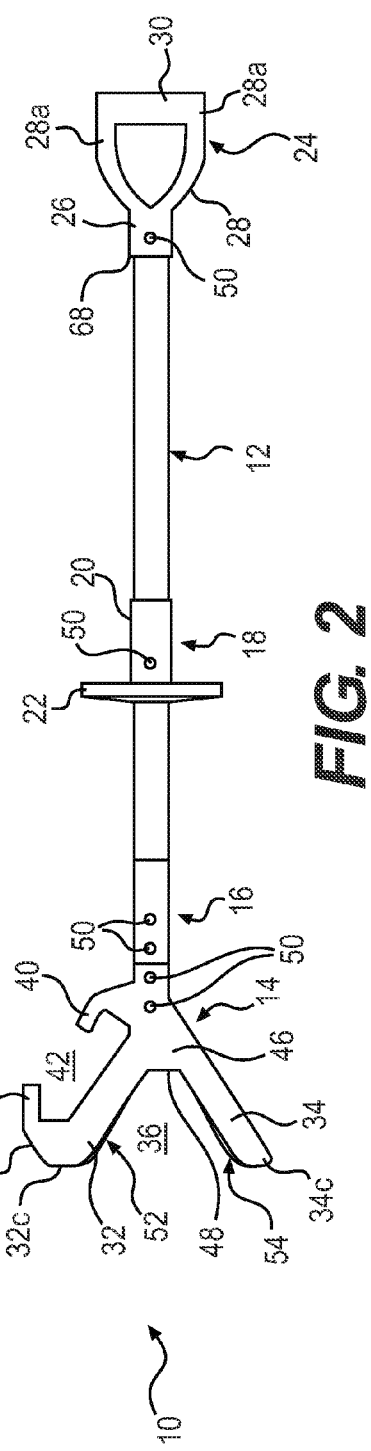

HAND TOOL

FIELD

A hand tool for multiple uses and applications, in particular for pushing, pulling, gripping, and/or manipulating objects or articles by a user. The hand tool includes a V-shaped or modified V-shaped tool head provided with one or more gripping or manipulating prongs and/or hooks.

BACKGROUND

There exists a need for a hand tool for pushing, pulling, gripping and/or manipulating objects. In particular, workers in a commercial or industrial setting often need a hand tool when working, for example, on an offshore oil rig, handling electrical power equipment, or when conducting manufacturing and maintenance operations. The uses for such a hand tool include pushing against surfaces, edges or corners of boxes and containers, moving pipes and tubular articles, and grabbing slings and taglines.

In these applications, workers are exposed to static electrical discharges or current when workers make contact with equipment or electrical current, which can result in severe injury or even death. Thus, there is a need for a hand tool that provides various modes of use, and an enhanced level of safety against such accidents and resulting injuries. Further, such a hand tool provides enhanced mechanical leverage for the workers.

SUMMARY

A first object is to provide an improved hand tool.

A second object is to provide a hand tool that is non-conductive.

A third object is to provide a hand tool, comprising or consisting of a handle connected to a tool head, the tool head including at least one prong.

A fourth object is to provide a hand tool, comprising or consisting of a handle connected to a tool head, the tool head including at least two prongs.

A fifth object is to provide a hand tool, comprising or consisting of a handle connected to a tool head, the tool head including a V-shaped or modified V-shaped configuration.

A six object is to provide a hand tool, comprising or consisting of a handle connected to a tool head, the tool head including a V-shaped or modified V-shaped configuration defined by two prongs.

A seventh object is to provide a hand tool, comprising or consisting of a handle; a tool head connected to the handle, the tool head including a V-shaped gripping plate defined by two prongs; and at least one resilient gripping member provided on an inner edge and/or an outer edge of at least one or both of the two prongs.

An eighth object is to provide a hand tool, comprising or consisting of a handle; a tool head connected to the handle, the tool head including a V-shaped gripping plate having two prongs; and at least one resilient gripping member provided on an inner edge and an end edge of at least one or both of the two prongs.

A ninth object is to provide a hand tool, comprising or consisting of an elongated handle; and a tool head connected to the handle, the tool head including a modified V-shaped gripping plate comprising two prongs with each prong comprising an inner gripping edge, outer manipulating edge, and an end manipulating edge oriented perpendicular relative to a center longitudinal axis of the handle, the end manipulating edge being positioned at an obtuse angle relative to the inner gripping edge of the gripping plate, the two prongs being spaced apart by an inner spacing edge oriented perpendicular to the center longitudinal axis of the handle; and a pair of resilient gripping members each provided on each prong, and extending along the inner gripping edge to the outer manipulating end around the obtuse angle of each prong, wherein an outer edge of one prong is provided with a pair of hook end portions defining a rectangular-shaped gripping recess; and wherein the tool head includes a receiver extending in a direction opposite of a centerline bisecting the prongs, and one end of said elongated handle being disposed within said receiver for connecting the elongated handle to the tool head.

A tenth object is provide a hand tool, comprising or consisting of a tool head having at least one prong having a hook end portion.

An eleventh object is to provide a hand tool, comprising or consisting of a tool head having at least one of prong having a pair of hook end portions defining a gripping recess.

A twelfth object is to provide a hand tool, comprising or consisting of a tool head having a resilient gripping member provided on an inside gripping edge of at least one prong.

A thirteenth object is to provide a hand tool, comprising or consisting of a tool head having a resilient gripping member defined by a resilient gripping insert connected to the tool head.

A fourteenth object is to provide a hand tool, comprising or consisting of a tool head having a prong with an inside edge having a receiver for accommodating a gripping member.

A fifteenth object is to provide a hand tool, comprising or consisting of a tool head having a receiver defined by a slot provided in a surface of the inner edge of at least one prong.

A sixteenth object is to provide a hand tool, comprising or consisting of a tool head having a resilient gripping member defined by a resilient plate gripping member.

A seventeenth object is to provide a hand tool, including a tool head having a resilient gripping member with an inner edge disposed within a slot in the surface of the inside edge of at least one prong, and a raised outer exposed edge extending above a surrounding surface of the inner edge of the at least one prong.

An eighteenth object is to provide a hand tool, comprising or consisting of a tool head having at least one prong provided with a gripping member with a flat perpendicular edge.

A nineteenth object is to provide a hand tool, comprising or consisting of a tool head having at least one prong provided with at least one resilient gripping member on an end edge of a prong.

A twentieth object is to provide a hand tool, comprising or consisting of a tool head having at least one prong with at least one resilient gripping member provided on an end edge of the at least one prong.

A twenty first object is to provide a hand tool, comprising or consisting of a tool head having at least one prong with a plate gripping member connected to the at least one prong by at least one pin provided through a thickness of the prong and a slot containing the plate gripping member.

A twenty second object is to provide a hand tool, comprising or consisting of a tool head having at least one prong with a plurality of spaced apart pins located along an inner gripping edge and an end manipulating edge of the at least one prong to retain a plate gripping member in an edge slot of the at least one prong.

A twenty third object is to provide a hand tool, comprising or consisting of a tool head having at least one prong provided with a hook end portion defining a modified U-shaped hook portion at an end of the prong.

A twenty fourth object is to provide a hand tool, comprising of or consisting of a tool head having at least one prong provided with a hook end portion including a straight end portion extending in a direction parallel to a centerline of a handle connected to the tool head and in a direction opposite to a bisecting forward direction of the prongs.

A twenty fifth object is to provide a hand tool, including a tool head having at least one prong provided with a hook end portion including an outer angled edge portion connecting to a straight end portion defining the hooked end portion.

A twenty sixth object is to provide a hand tool, comprising or consisting of a tool head having at least one prong provided with a plate gripping member including an elongated portion connected to a bent end portion defining a continuous outer gripping edge extending around an obtuse angle to provide an end gripping edge.

The hand tool includes a handle and a tool head. The handle and tool head can be made to be removably connected together, or permanently connected together. For tough work conditions, a permanent connection between the handle and tool head can provide a more rugged and damage resistant tool construction.

In one embodiment, the hand tool includes a handle, a tool head, and a sleeve reinforcing and/or connecting the handle and tool head together. The sleeve can be part of the handle, tool head, or a separate component or part. For example, the sleeve can be a round hollow sleeve. The sleeve can be injection molded or machined (e.g. using a lathe) from a block of stock material. One end of the sleeve is configured to receive one end of the handle. In one embodiment, the end of the handle is configured (e.g. hollow tube construction) to receive a dowel for connecting to the tool head (e.g. end of dowel is received in receiver or hole in tool head). In another embodiment, the end of the handle is configured to receive a protrusion or boss extending from the tool head.

The handle can have a variety of configurations. For example, the handle can be an elongated handle. The handle can be made from prefabricated tubing such as plastic tubing, fiberglass tubing, composite tubing (e.g. fiberglass, Kevlar, carbon graphite, and/or boron fiber combined with a curable resin such as epoxy resin, polyester resin, or other suitable resin), or metal tubing. For example, the handle is a non-conductive prefabricated safety orange colored fiberglass handle.

The handle optionally can be fitted with one or more hand grips. In one embodiment, a prefabricated forward hand grip is provided including a sleeve portion connected at one end to a round disk-shaped hand stop portion. The forward hand grip can be machined (e.g. using a lathe) from a block of stock material (e.g. from virgin black nylon resin) or injection molded. The round disk-shaped hand stop serves as a hand protector when the forward hand grip is assembled onto the handle. The forward hand grip can be adhered (e.g. using adhesive or glue) and/or mechanically fastened (e.g. using one or more screws, nylon screws) to the handle to prevent movement along the length of the handle or prevent rotation around the handle during use to complete the assembly thereof. It is noted that the disk-shaped hand stop is optional, and that other designs, for example, protrusions configured to assist a user's fingers to grip the sleeve can be provided in other embodiments of the forward hand grip.

The handle optionally can be fitted with a rear hand grip. The rear hand grip can be connected to the rear end of the handle. In one embodiment, the rear hand grip can be identical to the forward hand grip and assembly on the handle at or near the end thereof. In another embodiment, the rear hand grip can include a sleeve portion, configured for receiving an end portion of the handle, which sleeve is connected to a yoke portion having a hand grip portion extending between the ends of the yoke. The rear hand grip can be injection molded (e.g. from virgin black nylon resin) or machined (e.g. using a lathe and/or milling machine) from a block of stock material. The rear hand grip can be adhered (e.g. using adhesive or glue) and/or mechanically fastened (e.g. using one or more screws, nylon screws) to the end of the handle to prevent the rear hand grip from being pull off the end of the handle or prevent rotation around the handle during use to complete the assembly thereof.

In one embodiment, the tool head has a plate configuration. The plate configuration provides for a rugged and durable construction. For example, the tool head is injection molded or machined (e.g. using saw and/or milling machine) from a plate of stock material to provide a rugged and durable construction thereof. In this embodiment, the tool head has a uniform or fixed thickness. The thickness is selected for a particular design to provide adequate structural strength during use and operation thereof. The tool head, for example, can be made of virgin Ultra High Molecular Weight (UMHW) plastic.

The tool head can be configured to push, pull, grip and/or manipulate objects or articles. The tool head can also be designed to provide specialized uses.

In one embodiment, the tool head can be provided with a V-shaped or modified V-shaped arrangement. The V-shaped or modified V-shaped tool head defines a pair of prongs configured in a V-shaped or modified V-shaped arrangement. The V-shaped or modified V-shaped tool head can be configured so that an apex of the V-shaped or modified V-shaped tool head is located at or near the point of connection of the handle. Further, a longitudinal centerline of the handle is aligned with a bisecting centerline of the prongs of the tool head with the prongs extending forward away from the handle (i.e. 0° orientation embodiment). Alternatively, in other embodiments, the bisecting centerline of the prongs can be oriented at an angle (e.g. 5°, 15°, 30°, 45°, 90°, 120°) relative to the centerline of the tool head.

In the V-shaped embodiment of the tool head, the prongs define a V-shaped receiver having a shape defined by an apex and the inner edges of the prongs extending from the base to the end of each prong. In a modified V-shaped embodiment of the tool head, the prongs define a modified V-shaped receiver having a shape defined by a filled apex (due to a fillet) provided between the base of the prongs and defined by the inner edges of the prongs extending from the base to the end of each prong. The fillet increases the structural strength of the prongs from being separated apart by a spreading force (e.g. when wedging an object between the prongs of the tool head).

The tool head can include one or more gripping members, in particular resilient gripping members, to enhance the frictional contact between the tool head and an article or object. For example, the gripping member is made of rubber or a resilient plastic material providing an increased coefficient of friction relative to the surface of the material forming the main portion of the tool head.

In one embodiment, a gripping element is provided on the inner edge of each prong. In another embodiment, a gripping element is provided on the outer edge of each prong. In a further embodiment, a gripping element is provided on and bridging the inner edge and outer edge of each prong.

The gripping element, for example, can be a resilient plate gripping element disposed within a groove provided in at least a portion of one or more edges of a prong. Specifically, an inner edge of the plate gripping element is received within the groove and an outer edge of the plate gripping element extends out of the groove above a surrounding surface of the edge of the prong (i.e. raised edge). The resilient plate gripping element is retained within the groove, for example, by pinning the resilient plate gripping element within the groove. Specifically, a plurality of space apart pins are inserted in holes provided through the thickness of the tool head and along one or more edges of the prongs. The pins inserted in the holes in the prongs pass through the thickness of the resilient plate gripping element by penetrating same when installing the pins within the holes of the tool head. The pins are forced into the holes in the prongs to frictionally engage and/or slightly interference fit (i.e. anchored) within the holes to prevent inadvertent removal from the holes during the long term use of the hand tool.

In one embodiment, multiple resilient plate gripping elements can be provided on one or more edges of the prongs of the tool head. In another embodiment, a single resilient gripping element is used on one or more edges of the prongs of the tool head. For example, a resilient plate gripping element is cut or stamped from a sheet of resilient material, and having a "bent" configuration. Specifically, the resilient plate gripping element includes a longer first portion to extend along an inner edge of a prong, and a shorter second portion set at an angle relative to said first portion to extend along an outer edge of the same prong. For example, the angle is an obtuse angle to match the angle between the inner edge of the prong and the outer edge of the same prong. In this configuration, the outer gripping edge of the resilient plate gripping element "wraps around" the obtuse angled edge located between the inner edge and outer edge of the prong. This wrapped edge configuration on both prongs provides for two (2) points of contact of the tool head with an object, and can provide significant gripping functionally on behalf of the tool head.

Alternatively, and resilient rubber strip can be connected (e.g. adhered and/or mechanically fastened) to one or more edges of the prongs. For example, a one-side sticky back strip of resilient material including a release liner is use to apply a resilient surface to one or more edges of the prongs to increase the frictional engagement of the prongs with articles or objects.

Optionally, the tool head is provided with one or more gripping hooks. For example, one prong can be provided with a lower gripping hook. In addition, a second upper gripping hook can be provided on the same prongs defining a gripping recess (e.g. rectangular-shaped gripping recess). The lower hook portion can include a straight portion aligned parallel to the centerline longitudinal axis of the handle and oriented "reverse" relative to the direction of the prong (e.g. extends toward handle verses away from handle). The upper hook portion faces towards the lower hook portion in a manner, for example, to retain an object (e.g. rope or line) within the gripping recess once entered therein.

BRIEF DESCRIPTION

FIG. 1 is a perspective view of a first embodiment of the hand tool;

FIG. 2 is an elevational side view of the hand tool shown in FIG. 1.

DETAILED DESCRIPTION

Figure 3:
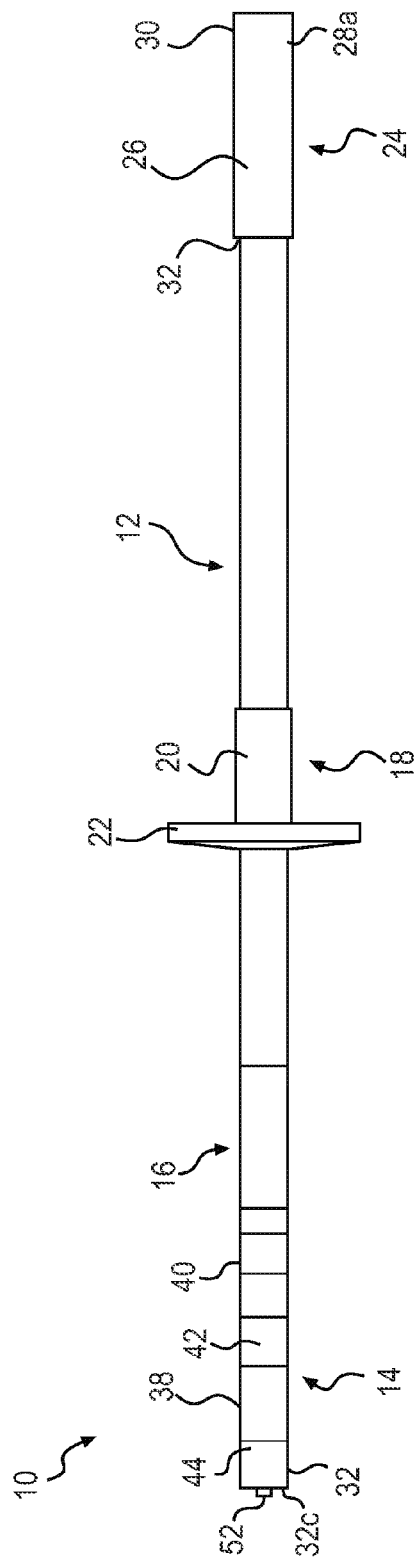
FIG. 3 is a top planar view of the hand tool shown in FIG. 1.
Figure 4:
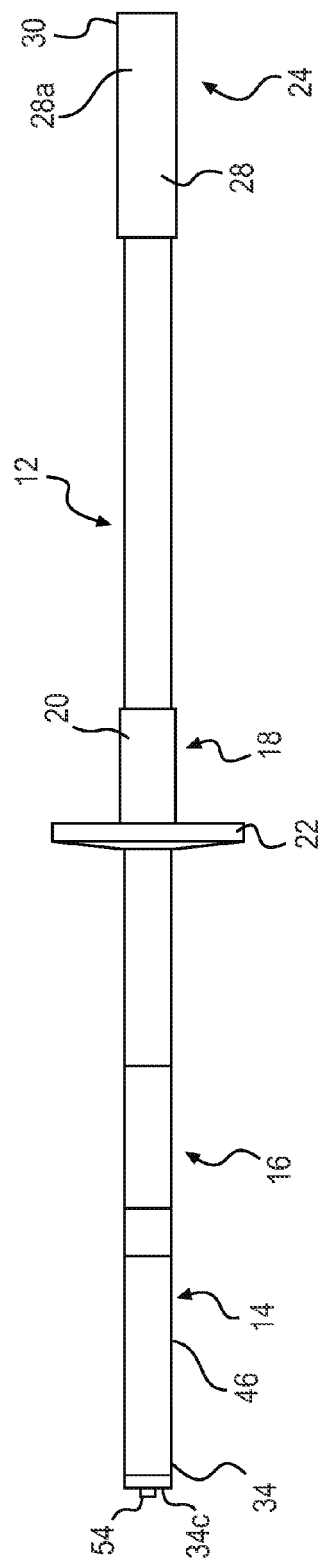
FIG. 4 is a bottom planar view of the hand tool shown in FIG. 1.
Figure 5:
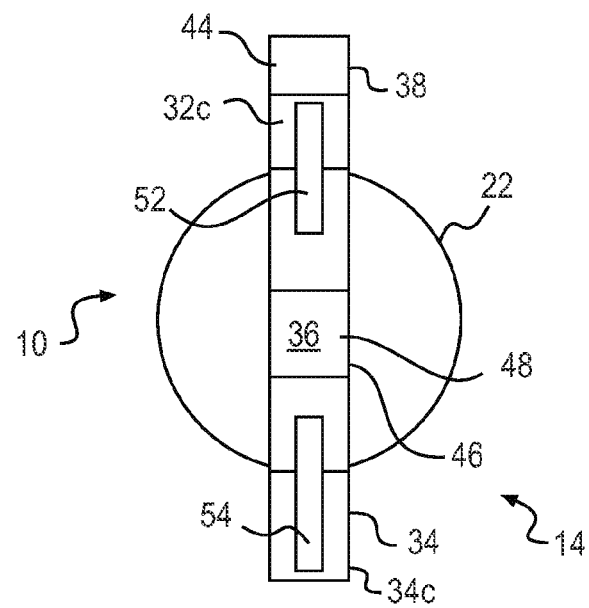
FIG. 5 is an front end elevational view of the hand tool shown in FIG. 1.
Figure 6:
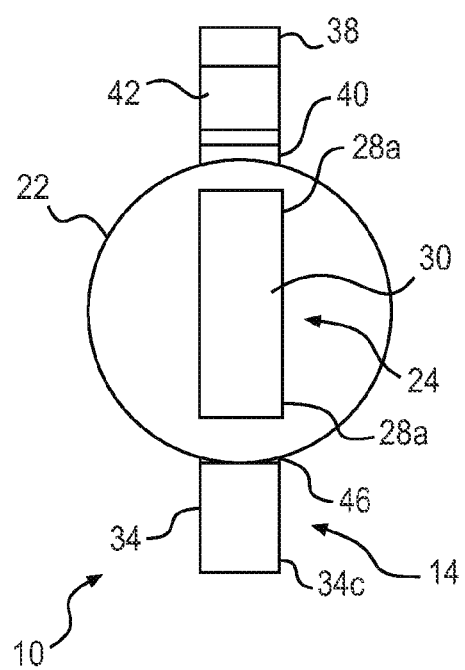
FIG. 6 is a back end elevational view of the hand tool shown in FIG. 1.

The term "about" as used herein refers to a quantity, level, value, dimension, size, or amount that varies to some extent based on the context in which it is used. For example, such variation can be by as much as 5%. At the least, each numerical parameter can be construed in light of the number of reported significant digits and by applying ordinary rounding techniques.

Any number range recited herein relating to any physical feature, such as dimension, size, or thickness, are to be understood to include any integer within the recited range, unless otherwise indicated.

It should be understood that the terms "a" and "an" as used above and elsewhere herein refer to "one or more" of the enumerated components. It will be clear to one of ordinary skill in the art that the use of the singular includes the plural unless specifically stated otherwise. Therefore, the terms "a," "an" and "at least one" are used interchangeably in this application.

Unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained.

Throughout the application, descriptions of various embodiments use "comprising" language; however, it will be understood by one of skill in the art, that in some specific instances, an embodiment can alternatively be described using the language "consisting essentially of" or "consisting of."

Other terms as used herein are meant to be defined by their well-known meanings in the art.

A hand tool 10 including a handle 12 and a tool head 14, is shown in FIGS. 1-6. The handle 12 is connected to the tool head 14, and reinforced by a connector 16 (e.g. hollow sleeve). The handle 12 is fitted with a front hand grip 18 including a sleeve portion 20 provided with a hand protector portion 22 (e.g. round disk) and a rear hand grip 24 defined by a sleeve portion 26 connected to a yoke portion 28 having a hand grip portion 30 bridging the ends 28*a*, 28*a* of the yoke portion 28.

The tool head 14 includes an upper prong 32 and a lower prong 34 defining a V-shaped or modified V-shaped tool head. A first gripping receiver 36 is defined between the upper prong 32 and lower prong 34. The upper prong 32 is provided with an end hook portion 38 cooperating with a hook portion 40 defining a second gripping receiver 42. A beveled edge portion 44 is provided between the end edge 32c of the upper prong 34 and end hook portion 38.

A fillet 46 is provided between the upper prong 32 and lower prong 34 to enhance the strength of the tool head 14 to prevent the upper prong 32 and lower prong 34 from being spread apart or compressed together. The fillet 46 includes an inner edge 48 defining an inner edge of the first gripping receiver 36.

Figure 7:
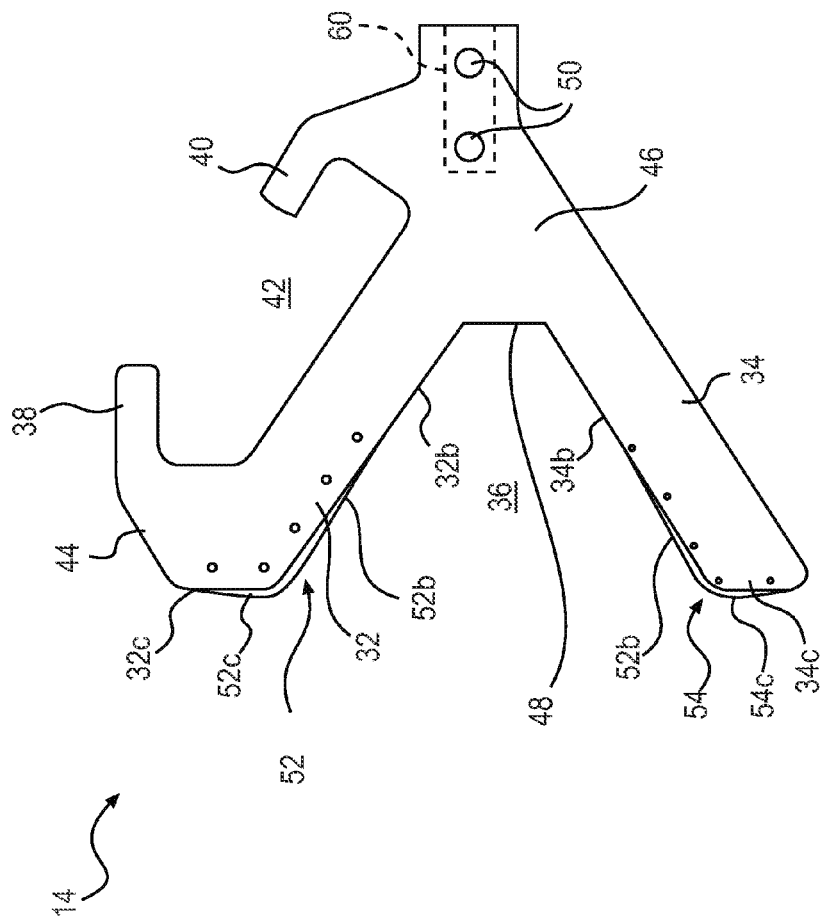
FIG. 7 is a detailed side elevational view of the tool head of the hand tool shown in FIG. 1.
Figure 9:
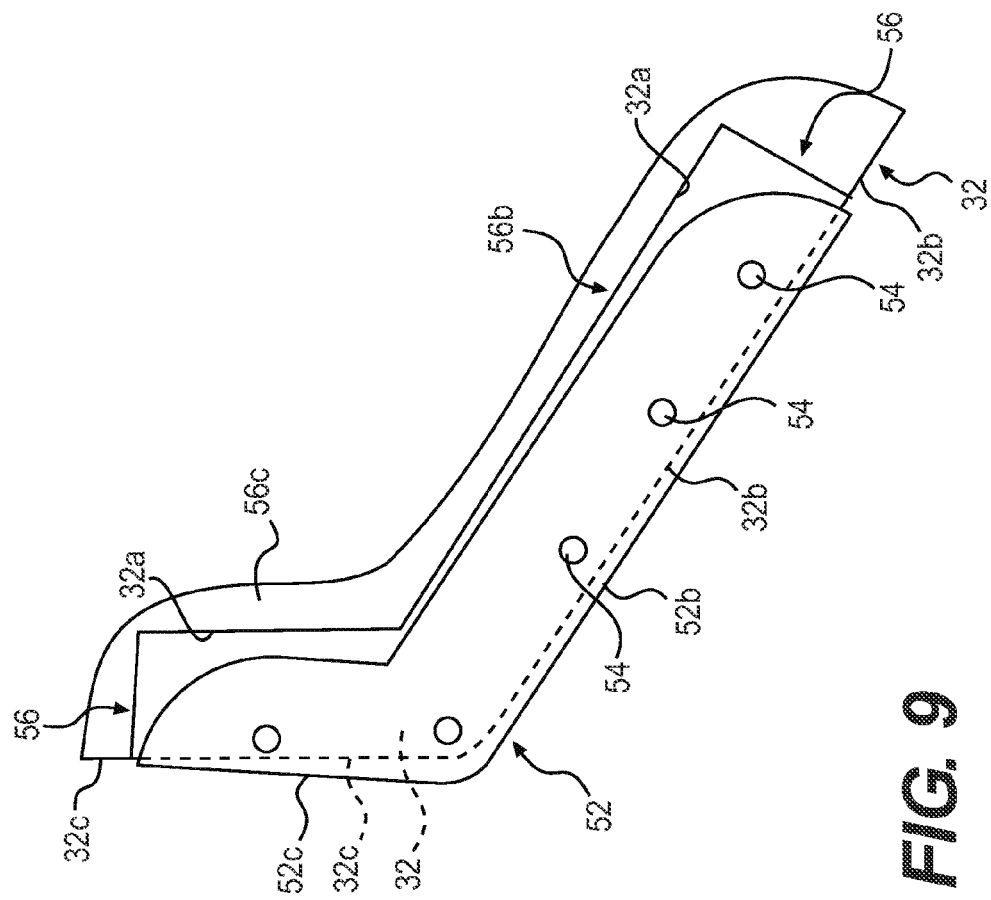
FIG. 9 is a broken away elevational side view showing the plate gripping member shown in FIG. 8 installed within a groove provided in the tool head shown in FIG. 7.
Figure 8:
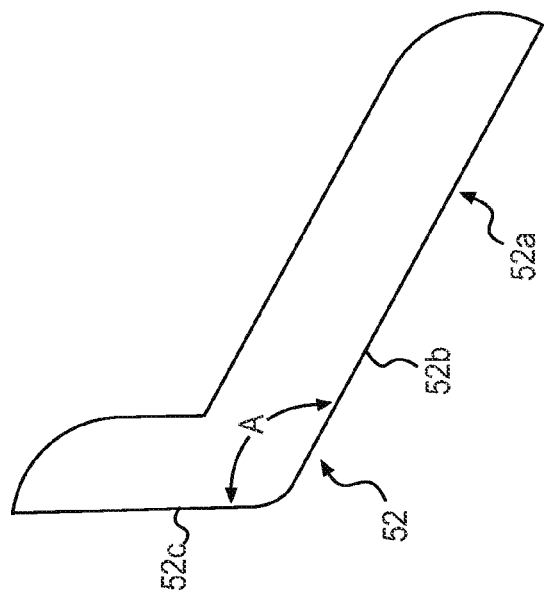
FIG. 8 is a side elevational view of a plate gripping member of the tool head of the hand tool shown in FIG. 1.

The tool head 14 is provided with a pair of gripping members 52, 54, as shown in FIGS. 7-9.

The gripping members 52, 54 are located in respective slots provided in one or more edges of the prongs 32, 34. For example, a slot 32a (FIG. 9) is provided in the inner edge 32b and outer edge 32c of the upper prong 32. A similar slot (not shown) is provided in the inner edge 34b and outer edge 34c of the lower prong 34. The slots have a width being a portion of the thickness of the prongs 32, 34, and can be centered, for example, on the respective edges of the prongs 32, 34.

The gripping members 52, 54 are the same size and shape (i.e. mirror image thereof), and are molded or cut from a sheet of material (i.e. resilient material, plastic, rubber, wear proof material, nylon, Teflon, polyurethane, polyethylene, polypropylene). Alternatively, the gripping members can be made to have different shapes and sizes.

As shown in FIG. 8, the gripping member 52 includes a gripping edge 52a having inner gripping edge portion 52b and outer gripping edge portion 52c. The inner gripping edge portion 52b is located along the inner edge 32b of the upper prong 32, and the outer gripping edge portion 52c is located along the outer edge 32c of the upper prong 32. The gripping member 52 (FIG. 7) is also applied in the same manner (i.e. reversed orientation or mirror image) to lower prong 34.

The angle A between the gripping edge portion 52b and gripping edge portion 52c of the gripping member 52 (FIG. 9) is shown being greater than ninety degrees (90°) (i.e. obtuse angle). This angle can vary (e.g. 45° to 135°).

As shown in FIG. 9, the gripping edge portions 52b, 52c of gripping member 52 are raised and located above the surfaces of the inner edge 32b and outer edge 32b, respectively, of the upper prong 32. This arrangement allows for the raised gripping edge portions 52b, 52c of the gripping member 52 to come into direct contact with an object or article being contacted by or gripped by the hand tool 10 instead of contacting the prongs 32, 34 directly. The gripping edge portions 52b, 52c of the gripping member 52 are made of a material (e.g. resilient material) having a higher coefficient of friction compared to edge surfaces of the prongs 32, 34 to enhance the gripping ability of the prongs 32, 34.

The handle 12 can be made of plastic (e.g. polyurethane), composite (e.g. fiberglass, Kevlar, carbon graphite, combination of materials) or metal (e.g. steel, aluminum) to provide suitable strength against bending and durability. For example, the handle 12 is made of an electrical non-conductive strong, safety orange colored fiberglass tubing cut to length.

The tool head 14 can be injection molded, or can be machined from a block of stock material (e.g. polyurethane, polyethylene, nylon, virgin black colored Ultra High Molecular Weight (UHMW)) plastic material.

The connector 16, forward hand grip 18, and rear hand grip 24 can be injection molded, or can be machined from a block of stock material (e.g. polyurethane, polyethylene, nylon, virgin black colored Ultra High Molecular Weight (UHMW)) plastic material.

Figure 10:
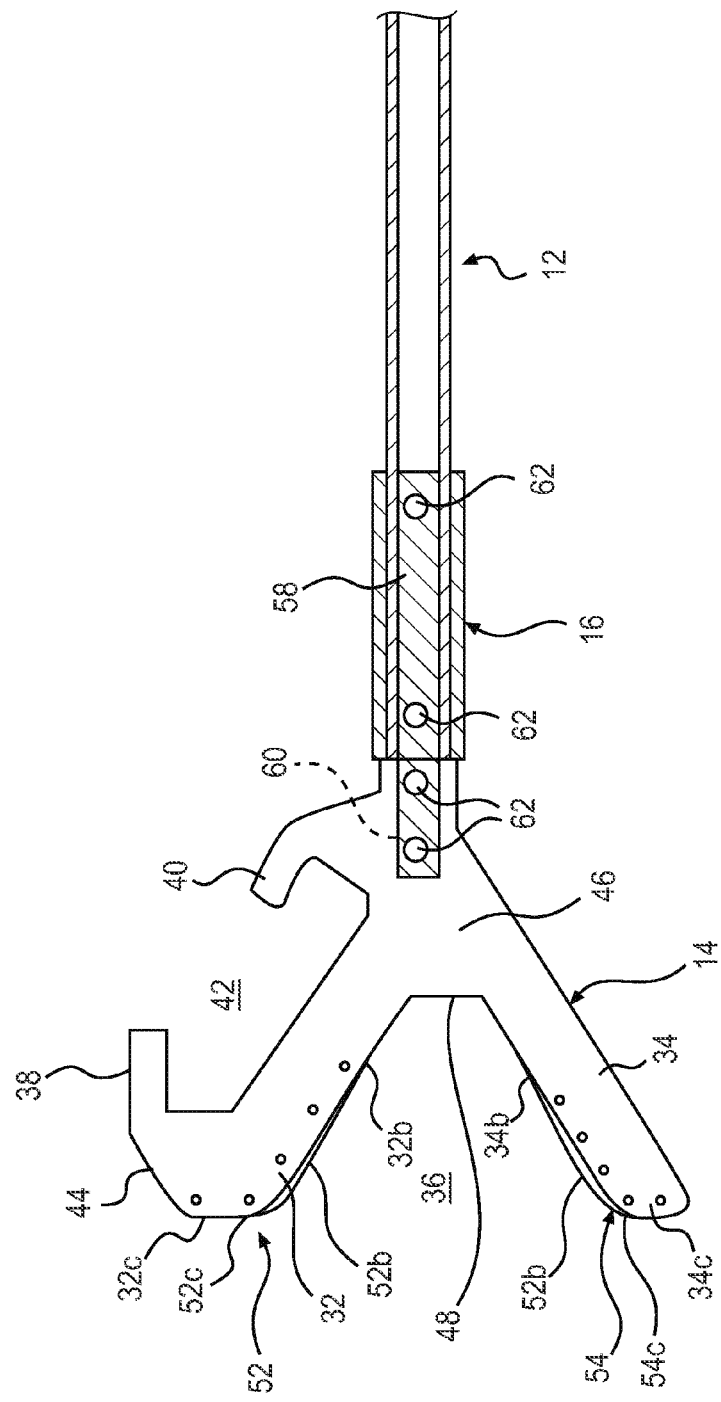
FIG. 10 is a partial sectional elevational side view of the handle tool shown in FIG. 1, illustrating one embodiment of the connection between the handle and tool head.

The handle 12 can be connected to the tool head 14 in various manners. For example, as shown in FIG. 10, the connector 16 is a tubular sleeve surrounding a forward end portion of the handle 12. One end of a dowel 58 is inserted into the hollow forward end portion of the tubular handle 12, and an opposite end of the dowel 58 is inserted into a receiver 60 (e.g. hole) of the tool head 14. The connector 16 and dowel 58 are screwed and glued into position as shown in FIG. 10 to complete the assembly of the handle 12 onto the tool head 14. The holes 62 in the sleeve 16, dowel 58, and the tool head 14 show the location where the screws after assembly.

Figure 11:
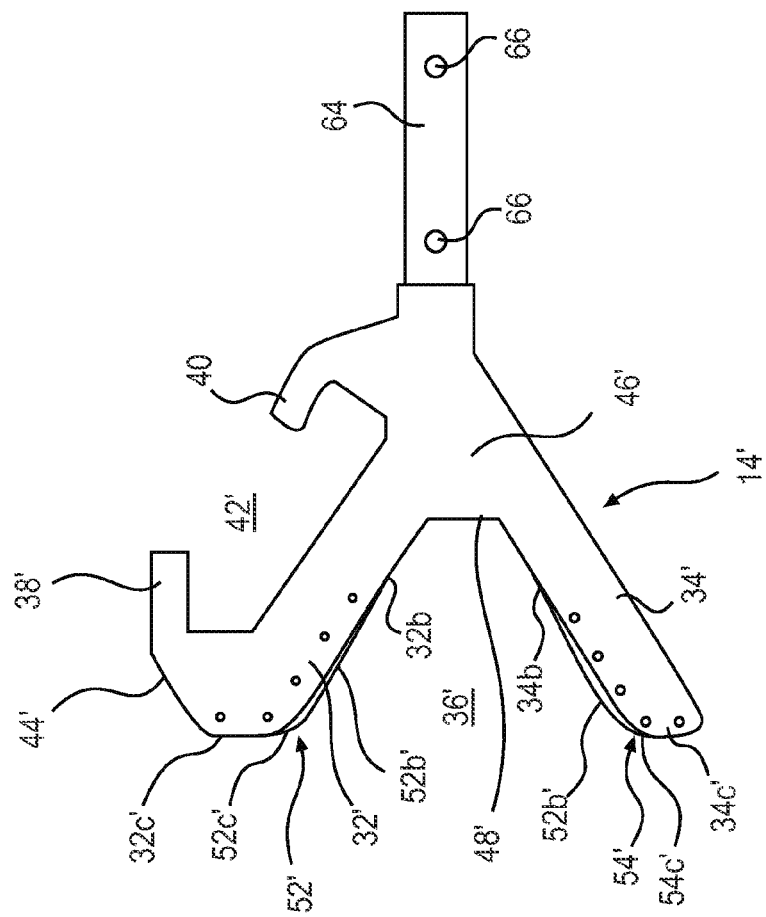
FIG. 11 is a partial sectional elevational side view of the tool head of the handle tool shown in FIG. 1, illustrating one embodiment of the connection between the handle and tool head.

Alternatively, as shown in FIG. 11, the tool head 14' is provided with a protrusion or boss 64 provided with through holes 66, 66. For example, the tool head 14' is machined (e.g. using a CNC milling machine) from a block of stock material, and the boss 64 is then machined (e.g. using lathe) to form a round boss 64 having an outer diameter the same or slightly greater than the inner diameter of the handle (See handle 12, FIG. 10). A sleeve connector, the same or similar to sleeve connector 16 shown in FIG. 10, is positioned over the front end concentric and overlapping the location of the boss 64 to further reinforce the connection between the handle (not shown) and tool head 14'.

In the embodiment shown in FIGS. 1-6, a centerline of the handle 12 is aligned with a centerline of the tool head 14 (i.e. the centerline of the tool head 14 bisects the prongs 32, 34). In this arrangement, the prongs 32, 34 face forward away from the handle 12. Alternatively, the tool head 14 can be configured so that the centerline of the tool head 14 bisecting the prongs 32, 34 is positioned at an angle relative to a centerline of the handle 12. For example, the centerline of the tool head 14 is positioned at an angle relative to the centerline of the handle 12 so that the lower prong 34 is aligned with the centerline of the handle 12 and the upper prongs 32 points more upwardly at an increased angle relative to the centerline of the handle 12. The off centerline angle for the tool head 14 relative to the handle 12, for example, can range from −120° to +120°. This can be accomplished by, for example, by machining the boss 64 (FIG. 11) at an angle relative to a centerline of the tool head 14'. Specifically, the position of the base of the boss 64 remains at the same attachment point on the tool head 14; however, the boss is placed at an angle up or down relative to the centerline of the tool head 14.

The end edges 32c, 34c of the prongs 32, 34 are located along an axis perpendicular relative to the centerline of the tool head 14. Alternatively, the end edges 32c, 34c can be set an angle relative to the centerline of the handle 12 and tool head 14 (e.g. 85°, 95°).

Figure 12:
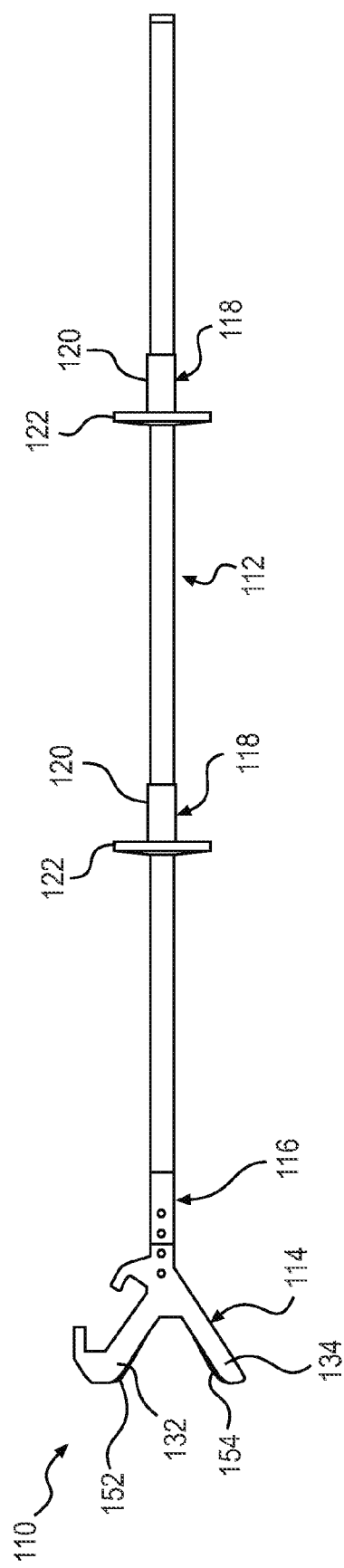
FIG. 12 is a side elevational view of another embodiment of the hand tool.

Another embodiment of the hand tool 110 is shown in FIG. 12. The hand tool 110 includes the handle 112, tool head 114, and connector 116 assembled together. In this embodiment, the handle 112 is provided with two hand grips 118, 118 positioned at a predetermined distance apart along the length of the handle 112. The hand grips 118, 118 each include a sleeve portion 120 and hand protector portion 122 (e.g. circular disk). The tool head 114 includes prongs 132, 134 having gripping member 152, 154, respectively.

During manufacturing, the tool head 14 is machined, for example, using a CNC milling machine from a block of stock material such as Ultra High Molecular Weigh (UMHW) plastic material. The handle is cut from stock fiberglass tubing, for example, using a cut-off saw.

During assembly of the hand tool 10, using the embodiment of the tool head 14 shown in FIG. 10, one end of the dowel 58 is fitted into the end of the handle 12, and the opposite end of the dowel 58 is fitted into the receiver 60 or hole in the tool head 14 (FIG. 10). The tubular connector 16 is positioned at the forward end of the handle 12, and then screwed and glued to connect the handle 12 to the tool head 14. The forward hand grip 18 is slid over the rear end of the handle 12, and then screwed and glued to connect the forward grip 18 to the handle 12 to prevent longitudinal or rotational movement relative to the handle 12 during use of the hand tool 10. The rear hand grip 24 having a receiver 68 is slid over the rear end of the handle 12, and then screwed and glued to the handle 12 to prevent longitudinal or rotational movement relative to the handle 12 during use of the hand tool 10. A plurality of screws 50 (e.g. metal, plastic, nylon) are installed as shown to assemble the hand tool 10.

Operation

The hand tool 10 can be used in a variety of applications, including pushing, pulling, and/or gripping operations. The hand tool 10 reduces hand injuries and avoids pinch points during lifting operations and while moving loads at a jobsite. The hand tool 10, for example, can be used to push against flat surfaces or corners of boxes and containers; move pipes and tubular; and grab slings and taglines.

A user grabs the hand grips 18 and 24 to lift the hand tool 10 to maneuver the tool head 14 into a pushing, pulling, or gripping position, and then engages an object, article, and/or equipment to handle same.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

I claim:

1. A hand tool, comprising:
an elongated handle; and
a tool head connected to the handle, the tool head comprising:
a V-shaped gripping plate comprising two prongs with each prong comprising an inner gripping edge, outer manipulating edge, and an end manipulating edge, the end manipulating edges being oriented perpendicular relative to a center longitudinal axis of the tool head, the end manipulating edges being positioned at an obtuse angle relative to the inner gripping edges of the two prongs, the two prongs being spaced apart by a fillet having an inner edge oriented perpendicular to the center longitudinal axis of the tool head; and
a pair of resilient gripping members each provided on each prong, each resilient gripping member extending along the inner edge to the outer end edge around an obtuse angled edge of each prong,
wherein an outer edge of one prong is provided with a pair of hook end portions defining a rectangular-shaped gripping recess; and
wherein the tool head comprises a receiver extending in a rearward direction opposite of a forward direction of a centerline bisecting the prongs, and one end of said elongated handle being disposed within said receiver for connecting the elongated handle to the tool head.

2. The hand tool according to claim 1, wherein the hook end portions comprise a front hook end portion extending in a direction parallel to the centerline of the tool head and in a direction opposite to the forward direction of the hand tool.

3. The hand tool according to claim 1, wherein the hook end portions comprise a rear hook end portion aligned parallel relative to the respective prong provided with the pair of hook end portions defining a rectangular-shaped gripping recess.

4. The tool according to claim 3, wherein the hook end portions comprises a front hook end portion extending in a direction parallel to the centerline of the tool head and in a direction opposite to the forward direction of the hand tool.

5. The tool according to claim 4, wherein the front hook end portion comprises an outer angled edge portion connecting the front hook end portion to the end manipulating edge of the respective prong.

6. The hand tool according to claim 1, wherein the resilient gripping members are located in respective slots provided in the edges of the prongs.

7. The hand tool according to claim 6, wherein the resilient gripping members are plate gripping members.

8. The hand tool according to claim 7, wherein inner edges of the plate gripping members are disposed within the slots provided in the surfaces of the inside edges of the prongs, and a raised outer exposed edges of the gripping plate members extend above a surface of the inner edges of the prongs.

9. The hand tool according to claim 8, wherein the outer exposed edges are flat edges oriented perpendicular relative to the plate gripping members.

10. The tool according to claim 7, wherein the plate gripping members are connected to the prongs by at least one pin provided in each prong extending through the respective slots containing the plate gripping members.

11. The tool according to claim 10, further comprising a plurality of spaced apart pins located along the inner gripping edges and outer manipulating edges of the prongs.

12. The hand tool according to claim 1, wherein the resilient gripping members are resilient gripping inserts connected to the prongs of the tool head.

13. The hand tool according to claim 12, wherein the inside edges of the prongs are provided with receivers for accommodating the gripping inserts.

14. The hand tool according to claim 13, wherein the receivers are slots provided in surfaces of the inner edges of the prongs.

15. The tool according to claim 1, wherein the handle is made of an electrical non-conductive material.

16. A hand tool, comprising:
a handle;
a tool head connected to the handle, the tool head comprising:
a V-shaped gripping plate comprising two prongs; and
at least one resilient gripping member provided on an inner gripping edge of at least one of the two prongs, the resilient gripping member is a resilient gripping insert connected to at least one prong of the tool head, the inside edge of the at least one prong is provided with a receiver for accommodating the gripping member, the receiver being a slot provided in a surface of the inner edge of the at least one prong, the resilient gripping insert being a plate gripping member, and the plate gripping member comprises an elongated portion provided with a bent end portion defining a continuous outer gripping edge extending around an obtuse angle to an end manipulating edge.

17. The hand tool according to claim 16, wherein at least one of the prongs comprises a hook end portion.

18. The hand tool according to claim 16, wherein at least one of the prongs comprises a pair of hook end portions defining a gripping recess.

19. The hand tool according to claim 18, wherein the hook end portions comprises a front hook end portion extending in a direction parallel to the centerline of the tool head and in a direction opposite to a forward direction of the hand tool.

20. The hand tool according to claim 19, wherein the hook end portions comprises a rear hook end portion aligned parallel relative to the respective prong provided with the pair of hook end portions defining a rectangular-shaped gripping recess.

21. The tool according to claim 19, wherein the front hook end portion comprises an outer angled edge portion connecting the front hook end portion to the end manipulating edge of the respective prong.

22. The hand tool according to claim 16, wherein each prong comprises a resilient gripping member provided on an inside gripping edge of each of the prongs.

23. The hand tool according to claim 16, wherein an inner edge of the plate gripping member is disposed within the slot provided in the surface of the inside edge of at least one prong, and a raised outer exposed edge of the gripping member extends above a surface of the inner edge of the at least one prong.

24. The hand tool according to claim 16, wherein the hook end portions comprises a rear hook end portion aligned parallel relative to the respective prong provided with the pair of hook end portions defining a rectangular-shaped gripping recess.

25. The hand tool according to claim 16, wherein the outer exposed edge is a flat edge oriented perpendicular relative to the plate gripping members.

26. The tool according to claim 16, wherein the plate gripping member is connected to the prong by at least one pin provided in the prong extending through the slot containing the plate gripping member.

27. The tool according to claim 26, further comprising a plurality of spaced apart pins located along the inner gripping edge and outer manipulating edge of the prong.

28. The tool according to claim 16, wherein the handle is made of an electrical non-conductive material.

* * * * *